US005127122A

United States Patent [19]

Sobotka

[11] Patent Number: 5,127,122

[45] Date of Patent: Jul. 7, 1992

[54] COMBINATION WEDGE PULLER AND SAWTOOTH HANGER-BRACKET REMOVER TOOL

[76] Inventor: Benny W. Sobotka, 1708 N. 23rd St., Lincoln, Nebr. 68503

[21] Appl. No.: 794,009

[22] Filed: Nov. 19, 1991

Related U.S. Application Data

[63] Continuation-in-part of Ser. No. 592,905, Oct. 3, 1990, abandoned.

[51] Int. Cl.[5] .......... B60F 15/00

[52] U.S. Cl. .......... 7/166; 294/100

[58] Field of Search .......... 7/166, 170; 294/99.2, 294/100

[56] References Cited

U.S. PATENT DOCUMENTS 2,585,098 2/1952 Elliott .......... 294/100

4,414,698 11/1983 Epstein .......... 7/170

*Primary Examiner*—James G. Smith

[57] ABSTRACT

A combination picture frame tool comprises a handle with a flat bottom face, a crowbar-like tool extending from the handle, and small gripping jaws at the lower front end of the handle for pulling fasteners out of picture frames. The handle is a rectangular slab with a flat bottom face and a rounded oblong opening through the middle to admit the fingers for grasping. The flat bottom face can rest upon a surface such as the backing of a picture frame. The front end of the lower face is beveled. Just above the beveled section, on the front end of the handle, are the gripper jaws. The jaws are worked through a mechanism by pushing on a thumb lever. The bevel allows the jaws to be positioned by tilting the handle, so the jaws can easily grasp wedges close to the generally plane surface of the backing. The crowbar tool, for prying staples out and cutting paper, extends from the rear end of the handle. It has a straight shank with a sharp chisel edge at the end for cutting paper. The chisel tip has a V-shaped indentation and can also be used for prying.

11 Claims, 3 Drawing Sheets

FIG. 3
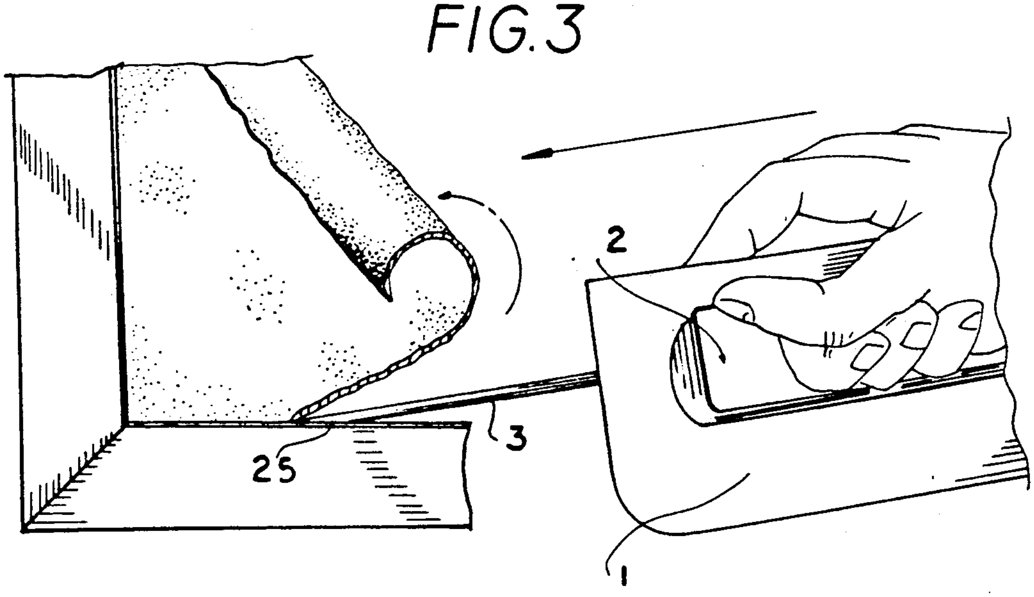
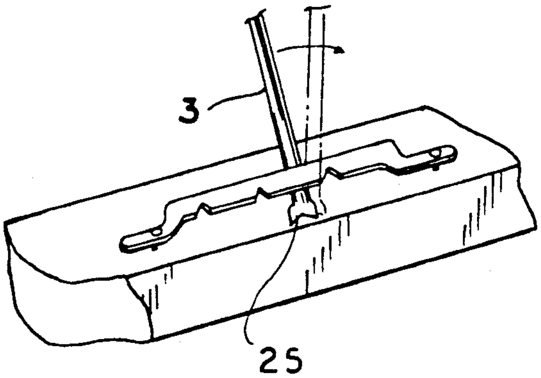
FIG. 4
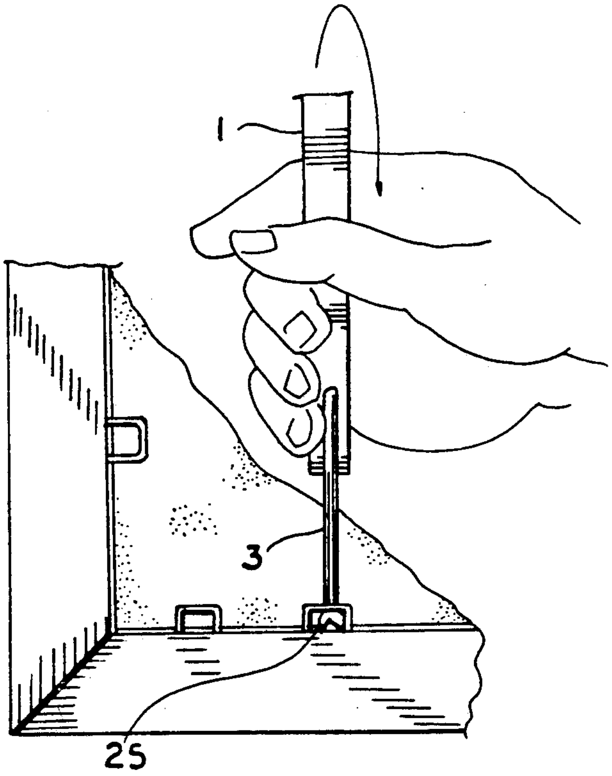
FIG. 5

COMBINATION WEDGE PULLER AND SAWTOOTH HANGER-BRACKET REMOVER TOOL

CROSS-REFERENCE TO RELATED APPLICATION

This application is a continuation-in-part of U.S. patent application Ser. No. 07/592,905 filed on Oct. 3, 1990, now abandoned.

FIELD OF THE INVENTION

The present invention relates to combination tools for removing staples, brackets, clips and the like. It is intended for use in picture framing.

DESCRIPTION OF THE PRIOR ART

The prior art shows a number of different combination tools for pulling staples and other small items from wood of other materials. Greene, in U.S. Pat. No. 1,537,766 shows a pair of pliers with one handle curved and offset to aid in pulling tacks.

Raez, in U.S. Pat. No. 1,469,696 shows pliers whose two arms or handle end in a flat screwdriver blade and an indented-chisel type tack puller, respectively. The jaws are adapted for lifting stove lids Yet another pair of multi-purpose pliers are shown in U.S. Pat. No. 1,664,081 of Means. This device, like that of Raez, shows a nail or tack puller on one arm and a screwdriver on the other. The jaws are adapted for removing U-shaped staples. One jaw is pointed and curved for prying.

Lee et al., in U.S. Pat. No. 4,741,059, show a combination pliers with a knockdown screwdriver held between the arms. The tool includes a knife, hammer, and nail remover.

None of the above inventions and patents, taken either singly or in combination, is seen to describe the instant invention as claimed.

The prior art does not show any combination tool adapted for use in picture framing. Nor does it disclose a gripper adapted to removing staples, wedges or glazier's points (small metal triangles with sharp points used to hold glass into wooden frames) from picture frames. All tools disclosed in the prior art are ill-adapted to grasping a small object which is both close to a picture frame backing surface and which must be removed by exerting force parallel to that surface to avoid damage.

Accordingly, one object of the present invention is a combination tool adapted for general picture framing use.

Another object is a tool adapted for removing staples or wedges holding a backing into a picture frame.

These and other objects of the present invention will become readily apparent upon further review of the following specification and drawings.

SUMMARY OF THE INVENTION

The present invention comprises a handle or frame with a crowbar-like tool and a special gripper for grasping the staples, wedges, or other small fasteners that hold the backing material into a picture frame. The handle is generally a solid, thick rectangle with a rectangular lower flat bottom face. The bottom face may rest upon the backing when the grippers are being aligned to a fastener. The handle has a rounded oblong through-hole or opening in the middle portion, which allows the handle to be gripped in one hand.

The crowbar tool extends from the back side of the handle parallel to the bottom face. The crowbar comprises a straight shaft with a sharpened chisel end for cutting paper. The sharp edge, at right angles to the length of the crowbar, has a V-shaped indentation in the middle for prying use.

One end of the lower surface, adjacent the front end of the handle, is beveled to form an inverted ramp. The beveled surface makes a shallow angle with the main portion of the bottom face. The two faces meet along a line at right angles to the length of the flat bottom face. At the end of the beveled section, extending gripper, for removing the fasteners. The gripper jaws are releasably clamped together by means of a thumb bar and mechanism.

The thumb bar, which lies vertically along the front end of the handle above the jaws, is worked by the thumb of the hand grasping the handle. The thumb pushes the upper end of the bar forward to operate the grippers. The bar is pivoted about a point near its middle. The lower end includes a pin which passes through a hole in the gripper. When the upper end of the thumb bar is pushed outward, the pin pulls the gripper into the handle.

The gripper, formed of elastic material, included upper and lower gripper jaws with gripper teeth, arms, and a hole portion. The arms are straight and extend from the jaws to the hole portion. The arms are inclined slightly away from one another, and diverge as they approach the jaws.

The gripper is held within a channel, with the jaws protruding from a slot in the front end of the handle close to the beveled section of the flat bottom face. The slot constricts the gripper is it is pulled inward by the pin. The diverging arms are forced together by the upper and lower edges of the slot, thus clamping the jaws tightly together.

The bevel allows the user to position the jaws to easily grasp wedges close to the generally plane surface of the backing. If the handle is tilted, the gripper jaws move toward and away from the backing surface as the handle rocks over the fulcrum made by the joint line between the bottom face and the adjoining beveled face. This makes it easy to manipulate the gripper jaws to surround and then grasp a wedge or staple lying a short distance off a backing surface. With the object grasped in the gripper teeth, it can easily be pulled out.

BRIEF DESCRIPTION OF THE DRAWINGS

FIG. 3 shows a picture frame with backing, and the sharpened end of the crowbar of the invention being used as a slitter to cut the backing.

FIG. 4 depicts the crowbar being used to pry out a sawtooth hanger bracket.

FIG. 5 shows a picture frame and the crowbar being used to pry out a staple to release the backing.

Similar reference characters denote corresponding features consistently throughout the attached drawings.

DETAILED DESCRIPTION OF THE PREFERRED EMBODIMENT

Figure 1:
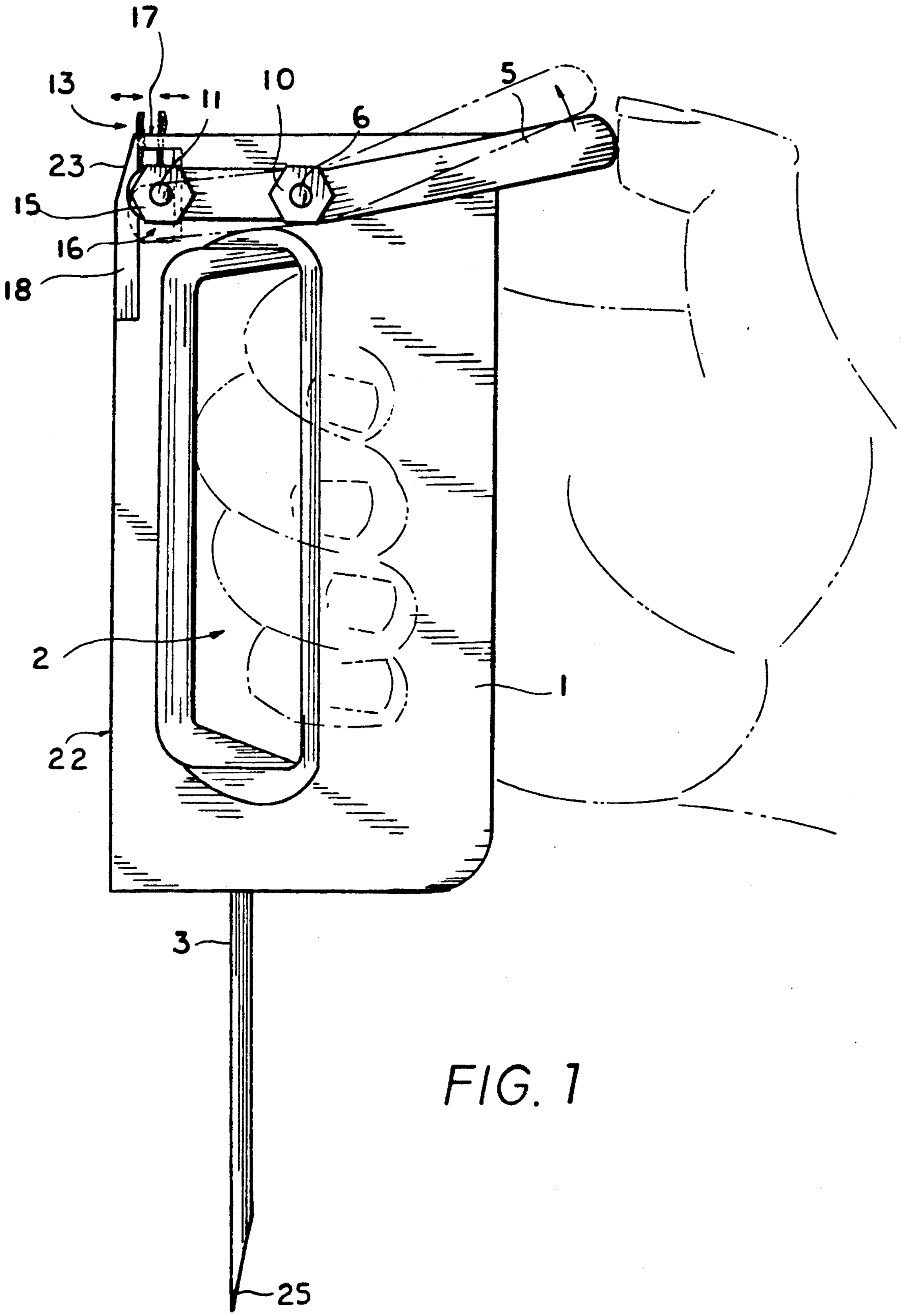
FIG. 1 is an elevational view of the present invention with a phantom hand shown grasping the handle in the position of use.

The present invention, shown tilted onto its side in FIG. 1, comprises a generally slab-shaped handle 1. The handle 1 includes an oblong central opening 2 for the four fingers of a hand to pass through for gripping. The interior of the opening 2 is preferably shaped for comfortable gripping.

Figure 2:
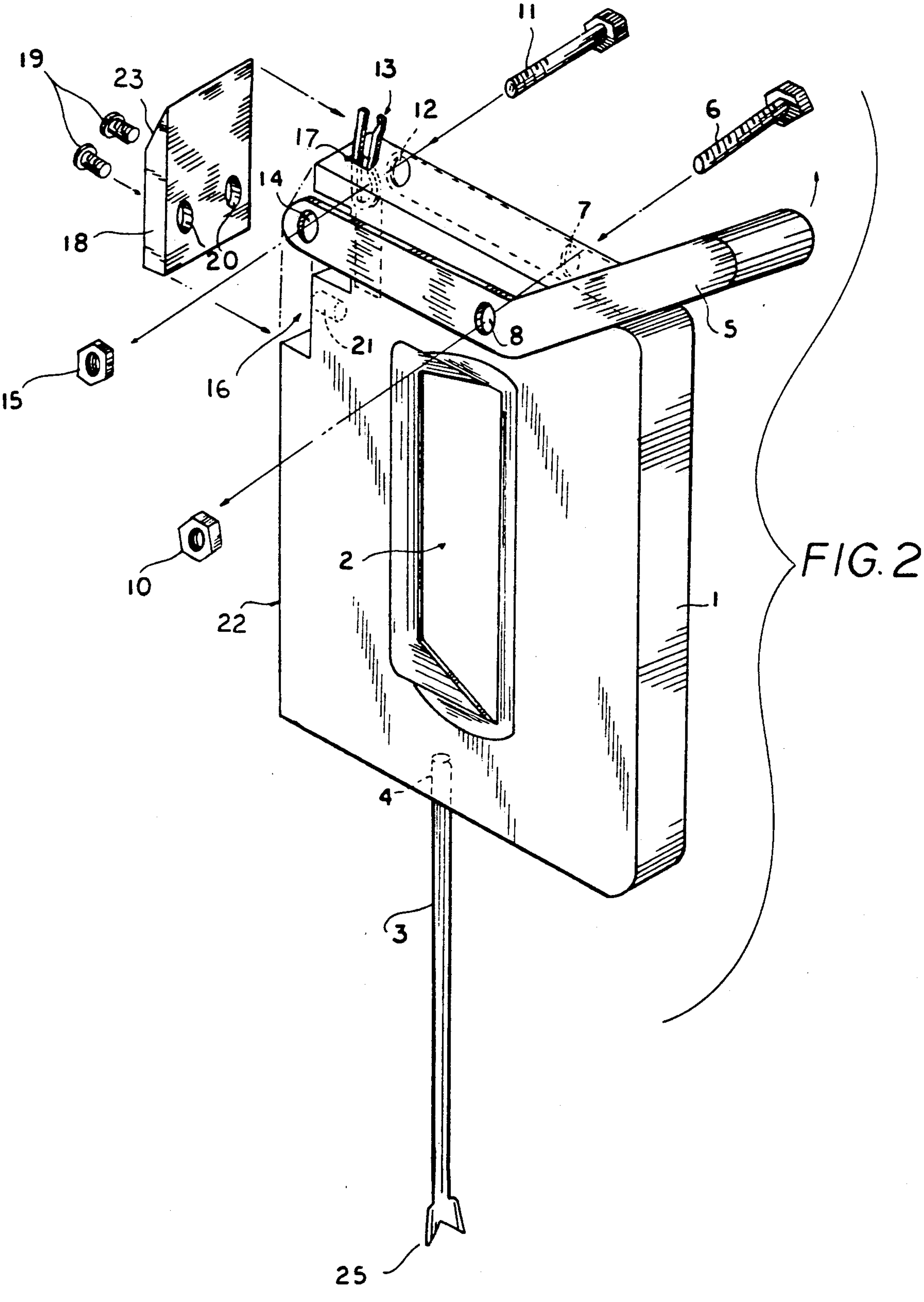
FIG. 2 is a perspective view showing some parts of the invention exploded out of the handle.

The bottom or lower side of the handle 1, on the viewer's left in FIGS. 1 and 2, includes a flat bottom face 22. The face 22 is rectangular and elongated. Adjoining the face 22 is a beveled face 23 at the forward end of the handle, which is, like the bottom face, planar. The beveled face 23 and the bottom face 22 meet at a shallow angle along a line perpendicular to the length of the bottom face 22.

When the handle 1 is grasped, a thumb bar 5 is in position for the user's thumb to push against it to close gripper 13 jaws through a mechanism (discussed below). The jaws of the gripper 13 are for grasping and pulling out the staples or wedges ("points") used to hold the backing into a picture frame.

The mechanism for closing the gripper jaws includes the thumb bar 5, pivot pin bolts 6 and 11 with nuts 10 and 15, and the gripper 13. The thumb bar 5 has a finger force area on its upper end for the user's thumb to comfortably push against, and two arms with matched holes 7, 8, and 12, 14 to accept the bolts 6 and 11. The central holes 7, 8 together with the pin bolt 6 act as a fulcrum or pivot point about which the bar 5 rotates in the plane defined by the body of the handle 1. It will be seen that at the lower end of the thumb bar 5 the holes 12, 13 and the bolt 11 held therein move in response to thumb pressure.

The gripper 13 is formed of a bent or curved member formed of a strong, elastic material such as steel. The gripper 13 includes jaws with teeth, straight arms inclined at an angle to one another, and a rounded partially circular bend (or a solid part with a hole through it). The radius of the bend is such that the pin bolt 11 fits snugly within.

The gripper 13 is slidably held within a groove 16 formed into the handle 1. The gripper jaws protrude through a rectangular slot 17 of fixed height. As the gripper 13 is drawn backward into the handle 1 by the mechanism, the diverging arms of the gripper 13 are forced together by the upper and lower edges of the hole 17, bringing the teeth of the gripper 13 together.

Preferably, the channel 16 behind the slot 17 is covered by a plate 18 which can replace part of the handle 1. The channel 16 can then be a groove routed or cast into the body of the handle 1, and the gripper 13 will be kept from falling out by the plate 18, which is detachably held in place by flush-head screws 19 passing through screw holes 20 in the plate 18 to screw holes 21 in the handle 1 body.

The plate 18 may include part of the bottom face 22, and all of the beveled face 23, as well as sections of the sides of the handle 1.

The plate 18 is preferably of hard metal. If the body of the handle 1 is made of wood or plastic, the plate 18 will decrease wear. The upper surface of the plate 18 can also serve as a bearing surface, if the slot 17 is made so that the lower edge is the top surface of the plate 18.

In use, the gripper 13 teeth are brought near to an fastener such as a wedge or staple, and the teeth are placed over the object. In picture frame work, it will be clear that the bottom surface 22 may be slid over another surface such as the backing of the framed picture. It will also be clear that the handle 1 may be rocked over the junction line of the bottom face 22 and the beveled face 23 to accurately position the gripper 13 teeth relative to a surface on which the handle 1 rests. Once the teeth are around an object, it may be gripped by pushing the bar 5 with the thumb.

In the rear of the handle 1 a hole 4 is bored or molded to hold the elongated shank of a crowbar 3. The crowbar 3 includes a chisel tip 25 (a narrow wedge shape whose edge is generally perpendicular to the length of the shank) which may be sharpened for cutting paper. This edge is not completely straight, but rather is indented in a V shape. The crowbar 3 is useful for trimming paper or backing material and for prying. FIGS. 3–5 show the crowbar in use cutting, prying off a sawtooth hanger bracket, and bending a staple, respectively.

It is to be understood that the present invention is not limited to the sole embodiment described above, but encompasses any and all embodiments within the scope of the following claims.

I claim:

1. A combination tool comprising:

a handle having a flat bottom face and a flat beveled face adjoining said bottom face along a line, said beveled face adjoining a front end of said handle, said front end distal said line, said bottom face and said beveled face relatively inclined at a shallow angle;

a pair of gripper jaws extending from said front end adjacent said beveled face, said jaws relatively movable for grasping objects; and a mechanism for moving said jaws for grasping objects upon finger motion of a hand grasping said handle.

2. The tool according to claim 1, including a crowbar extending from said handle, said crowbar comprising:

an elongated shank;

a chisel tip on an end of said shank distal said handle, said tip including a chisel tip edge generally perpendicular to the length of said shank.

3. The tool according to claim 2 wherein said chisel tip edge is V-shaped.

4. The tool according to claim 2 wherein said crowbar is made of metal.

5. The tool according to claim 1 wherein said handle includes an opening through which fingers may be inserted for grasping said handle.

6. The tool according to claim 1 wherein said mechanism includes:

a slot adjacent said beveled face in said front end, said slot having upper and lower edges a fixed distance apart;

a gripper including said jaws, and further including a pair of substantially straight arms extending from respective ones of said jaws to a hole portion of said gripper, said arms disposed in diverging relationship from said hole portion, said arms disposed within said slot, said arms including an upper arm adjacent said upper edge and a lower arm adjacent said lower edge, said arms diverging from a lesser separation adjacent said hole portion to a greater separation adjacent said jaws, said lesser separation less than said fixed distance between said upper and lower edges, said greater separation greater than said fixed distance between said upper and lower edges; and a thumb bar, rotatably mounted on a pivot point of said handle, having a lower end attached to a pin and an upper end including a finger force area, said hole portion of said gripper including a hole for accepting therethrough said pin; whereby when a force is exerted on said finger force area, said thumb bar rotates about said pivot point and said pin forces said gripper arms to move within said slot, causing said jaws to relatively move for grasping.

7. The tool according to claim 5 wherein said pin and said pivot point include cap screws and nuts.

8. The tool according to claim 5 including a channel, adjoining said slot, within said handle for containing said pin and said pin portion.

9. The tool according to claim 8 including a beveled face plate detachably mounted on said handle and having plate surfaces including said flat beveled face, said beveled face plate covering a front end of said channel.

10. The tool according to claim 9 wherein said crowbar is made of metal.

11. The tool according to claim 1 wherein said jaws include teeth for frictional grasping.

* * * * *